No. 848,960. PATENTED APR. 2, 1907.
W. BRAUN.
DESICCATING MATERIAL.
APPLICATION FILED DEC. 15, 1905.
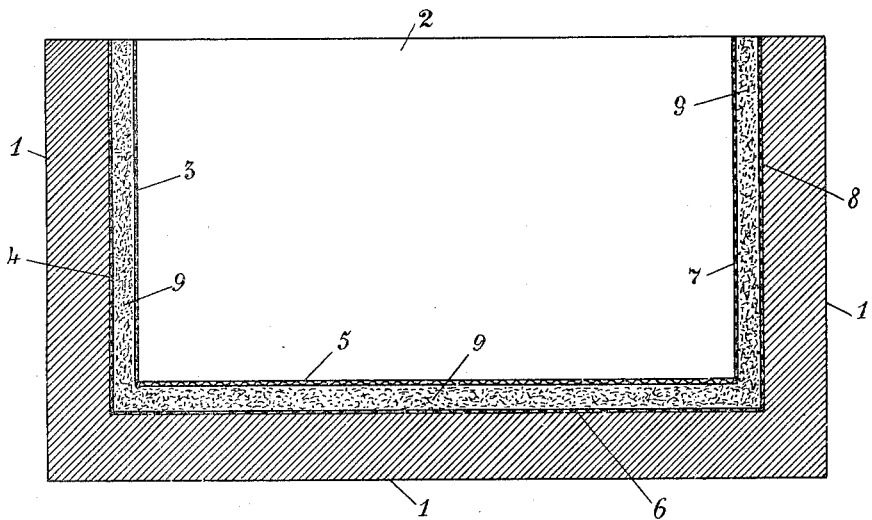
Witnesses:
Rich. Lange.
Gertzon Rol
Inventor:
Wilhelm Braun.

UNITED STATES PATENT OFFICE.

WILHELM BRAUN, OF FEUERBACH, NEAR STUTTGART, GERMANY.

DESICCATING MATERIAL.

No. 848,960.      Specification of Letters Patent.      Patented April 2, 1907.

Application filed December 15, 1905. Serial No. 291,859.

*To all whom it may concern:*

Be it known that I, WILHELM BRAUN, a subject of the Emperor of Germany, and a resident of Feuerbach, near Stuttgart, Germany, have invented new and useful Improvements in Desiccating Material, of which the following is a specification.

It has been proposed to pack goods such as are easily damaged by moisture and light in tins or boxes in which is placed a hygroscopic substance, such as chlorid of calcium or the like. The employment of pure chlorid of calcium has, however, the drawback that it very soon liquefies on account of its property of absorbing moisture, so that drops of the liquefied chlorid may come into contact with the sensitive goods and destroy the latter. Furthermore, the shocks to which the goods are subjected during their transportation result very often in breaking the solid body of chlorid of calcium in small pieces, which may also come in contact with the goods and destroy them.

To avoid all these drawbacks, the present invention provides a dry medium which is effectively and thoroughly prevented from liquefying and breaking. The dry medium consists of a hygroscopic matter—such as chlorid of calcium, pentoxid of phosphorus, or the like—which is first finely ground and then intimately mixed with powdered plaster-of-paris. Now as soon as the hygroscopic matter gets liquefied it is absorbed at once by the plaster-of-paris, and thus rendered harmless. Of course the mixture of hygroscopic matter and plaster-of-paris should not be placed in powdered condition. I have found that the best method is to add to the mixture a quantity of ground turf and mix thoroughly. After this the dry medium thus obtained is for a certain time exposed to moist air, whereby a solid cake is obtained.

To receive the drying medium, the box or tin must be provided with a suitable arrangement, which may consist in the provision of a flat case of which the lower side adjacent to the goods is in the known manner formed by a wire-gauze and of which the side walls are perforated, so as to expose the largest possible surface of the drying medium to the air in the receptacle.

In the accompanying drawing a box provided with such a suitable arrangement is shown in a vertical section.

1 represents the common packing-box, into which a second double-walled box 2 is inserted, between the walls 3 4 5 6 7 8 of which the desiccating material 9 is placed.

The lower side 5 adjacent to the goods is formed by a wire-gauze, and the side walls 3 4 7 8 are perforated. The goods to be transported or packed are placed in the interior of the box 2.

As it has been proved by experience, the new drying medium is capable of absorbing water up to seventy per cent. of its own weight without altering its shape in any way when being subjected to shocks during transportation. The proportion of the quantities of the three ingredients may be determined at will, though a mixture of four parts of hygroscopic matter, two parts of plaster-of-paris, and one part of turf has proved to be very efficient in practice.

The new drying medium is particularly adapted for keeping the packages of photographic plates dry, though it may be of course used in connection with packages of any kind of goods sensitive to moisture. This new drying medium is especially well adapted to the transportation of goods to the tropics, as goods of this character suffer a considerable deterioration when exposed to the moist heat in these latitudes.

I claim—

1. The herein-described desiccating material, composed of a hygroscopic matter, powdered plaster-of-paris, and ground turf, substantially as described, and for the purpose set forth.

2. The herein-described desiccating material, comprising four parts of a hygroscopic matter, two parts of plaster-of-paris, and one part of ground turf, substantially as described, and for the purpose set forth.

In testimony whereof I have hereunto set my hand in the presence of two subscribing witnesses.

WILHELM BRAUN.

Witnesses:
    WILHELM JENNC,
    O. GEIER.